(12) United States Patent
Wu et al.

(10) Patent No.: US 7,336,867 B2
(45) Date of Patent: *Feb. 26, 2008

(54) WAVELENGTH-SELECTIVE 1×N² SWITCHES WITH TWO-DIMENSIONAL INPUT/OUTPUT FIBER ARRAYS

(75) Inventors: Ming-Chiang Wu, Orinda, CA (US); Jui-Che Tsai, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/444,146

(22) Filed: May 30, 2006

(65) Prior Publication Data

US 2006/0291773 A1   Dec. 28, 2006

Related U.S. Application Data

(63) Continuation of application No. 11/053,182, filed on Feb. 7, 2005, now Pat. No. 7,072,539, which is a continuation of application No. PCT/US03/17043, filed on May 30, 2003.

(60) Provisional application No. 60/402,387, filed on Aug. 8, 2002.

(51) Int. Cl.
   *G02B 6/26* (2006.01)
(52) U.S. Cl. .............................. 385/18; 385/31; 385/47
(58) Field of Classification Search ..................... None
   See application file for complete search history.

(56) References Cited

U.S. PATENT DOCUMENTS

| | | | |
|---|---|---|---|
| 6,097,859 A | 8/2000 | Solgaard et al. | |
| 6,263,127 B1 | 7/2001 | Dragone et al. | |
| 6,374,008 B2* | 4/2002 | Solgaard et al. | ............. 385/17 |
| 6,704,476 B2 | 3/2004 | Ford et al. | |
| 7,072,539 B2* | 7/2006 | Wu et al. | ..................... 385/18 |
| 2002/0071627 A1 | 6/2002 | Smith et al. | |
| 2002/0131698 A1 | 9/2002 | Wilde | |
| 2003/0043472 A1 | 3/2003 | Mandella | |
| 2003/0048980 A1 | 3/2003 | Hoen | |

OTHER PUBLICATIONS

J.E. Ford et al., Wavelength Add-Drop Switching Using Tilting Micromirrors,: J. Light Technol., 17, 904-911 (1999).

D. Hah et al., "A Low Voltage, Large Scan Angle MEMS Micromirror Array with Hidden Vertical Comb-Drive Actuators for WDM Routers," 2002 Optical Fiber Communication (OFC) Conference, Anaheim, California, Mar. 17-24, 2002.

D.M. Marom et al., "Wavelength-Selective 1×4 Switch for 128 WDM Channels at 50GHz Spacing," 2002 Optical Fiber Communication (OFC) Conference, Postdeadline Papers (FB7), Anaheim, California, Mar. 17-24, 2002.

(Continued)

*Primary Examiner*—Sung Pak
(74) *Attorney, Agent, or Firm*—John P. O'Banion

(57) ABSTRACT

A 1×N² wavelength selective switch (WSS) configuration in which switch elements are configured in a way that enables the input or output fibers to be arranged in a two-dimensional (2D) array. By employing 2D arrays of input/output channels, the channel count is increased from N to N² for wavelength selective switches. In one embodiment, in which the components are arranged as a 2-$f$ imaging system, a one-dimensional (1D) array of mirrors is configured such that each mirror has a dual scanning axis (i.e., each mirror can be scanned in X and Y directions). In another embodiment, in which the components are arranged as a 4-$f$ imaging system, two 1D arrays of mirrors are configured with orthogonal scanning directions. In both embodiments, the number of ports is increased from N to N².

25 Claims, 6 Drawing Sheets-

OTHER PUBLICATIONS

D. Hah et al., "Low Voltage MEMS Analog Micromirror Arrays with Hidden Vertical Comb-Drive Actuators," 2002 Solid-State Sensor and Actuator Workshop, Hilton Head, SC, Jun. 2002.

S. Huang et al., "Open-Loop Operation of MEMES WDM Routers with Analog Micromirror Array," IEEE/LEOS International Conference on Optical MEMS, Lugano, Switzerland, Aug. 20-23, 2002.

* cited by examiner

WAVELENGTH-SELECTIVE 1×N² SWITCHES WITH TWO-DIMENSIONAL INPUT/OUTPUT FIBER ARRAYS

CROSS-REFERENCE TO RELATED APPLICATIONS

This application is a continuation of U.S. application Ser. No. 11/053,182 filed on Feb. 7, 2005, now U.S. Pat. No. 7,072,539, incorporated herein by reference in its entirety, which is a 35 U.S.C. § 111(a) continuation of PCT international application serial number PCT/US03/17043 filed on May 30, 2003 which designates the U.S., incorporated herein by reference in its entirety, and which claims priority from U.S. provisional application Ser. No. 60/402,387 filed on Aug. 8, 2002, incorporated herein by reference in its entirety. Priority is claimed to each of the foregoing application.

INCORPORATION-BY-REFERENCE OF MATERIAL SUBMITTED ON A COMPACT DISC

Not Applicable

STATEMENT REGARDING FEDERALLY SPONSORED RESEARCH OR DEVELOPMENT

This invention was made with Government support under Grant No. N66001-00-C-8088, awarded by DARPA/SPAR-WAR. The Government has certain rights in this invention.

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

The present invention pertains generally to wavelength-selective switches (WSS), and more particularly to a $1 \times N^2$ WSS that uses a two-dimensional array of input/output fibers whereby the number of output ports are significantly increased.

2. Description of Related Art

Wavelength-selective switches (WSS) that support individual wavelength switching are of great interest for transparent optical networks. Recent advances in WSS technologies have revolutionized optical fiber communication networks. Wavelength-selective switches have received a great deal of attention because their ability to route different wavelength channels independently. For example, Ford et al. proposed the first MEMS (Micro-Electro-Mechanical Systems)-based optical add/drop multiplexer (OADM) using a digital micromirror array (J. E. Ford, V. A. Aksyuk, D. J. Bishop, and J. A. Walker, "Wavelength add-drop switching using tilting micromirrors," J. Lightwave Technology, vol. 17, p. 904-11, 1999, incorporated herein by reference). The use of MEMS micromirrors offers lower insertion loss and faster speed than liquid-crystal-based OADM (J. S. Patel and Y. Silberberg, "Liquid crystal and grating-based multiple-wavelength cross-connect switch," IEEE Photon. Technol. Lett., 7, 514-516 (1995), incorporated herein by reference). This OADM is essentially a 1×1 wavelength-selective switch; however, a multiport wavelength-selective switch can be realized by replacing the digital micromirrors with analog micromirrors and expanding the input/output fibers into a linear array. This is a useful network element because it can be used either as a versatile multiport add-drop multiplexer or as a basic building block for N×N wavelength-selective crossconnect (WSXC).

Several 1×N WSS configurations also have been reported. Examples of such configurations as described in D. M. Marom, et al., "Wavelength-selective 1×4 switch for 128 WDM channels at 50 GHz spacing," 2002 Optical Fiber Communication (OFC) Conference, Postdeadline Papers (FB7), Anaheim, Calif., Mar. 17-24, 2002, FB7, incorporated herein by reference; A. R. Ranalli, B. A. Scott, J. P. Kondis, "Liquid crystal-based wavelength selectable crossconnect," ECOC 1999, incorporated herein by reference; T. Ducellier, et al., "The MWS 1×4: a high performance wavelength switching building block," ECOC 2002, incorporated herein by reference; and S. Huang, J. C. Tsai, D. Hah, H, Toshiyoshi, and M. C. Wu, "Open-loop operation of MEMS WDM routers with analog micromirror array," 2002 IEEE/LEOS Optical MEMS Conf., incorporated herein by reference.

Such switches are basic building blocks for N×N fully non-blocking wavelength-selective optical crossconnect. In current switch designs, however, the port count is limited by optical diffraction. Note that the switches reported to date are generally limited to 1×4, though adding circulators to each port can double the port count.

For example, FIG. 1 schematically illustrates a WDM router 10 implemented with a one-dimensional (1D) analog scanning micromirror array 12. This router can handle multiple spatial and multiple wavelength channels at the same time. The optical beams 14 from input/output fibers are first collimated and then dispersed by a diffraction grating 16. Each wavelength is focused onto a corresponding micromirror 18 in array 12 by a focusing lens 20. The wavelength can be routed independently to any of the fibers by tilting the corresponding micromirror. As can be seen, however, the maximum number of input/output fibers will be limited by optical diffraction for a given number of wavelength channels.

It will be appreciated that larger port count ($\geq 10$) WSS configurations are needed for high capacity networks. The present invention satisfies that need, as well as others, and overcomes limitations in current WSS switch designs.

BRIEF SUMMARY OF THE INVENTION

The present invention comprises a $1 \times N^2$ wavelength selective switch (WSS) configuration. In accordance with an aspect of the invention, the input or output fibers are arranged in a two-dimensional (2D) array rather than in a one-dimensional (1D) array.

The present invention provides for a larger number of input or output channels compared to previously developed configurations. By employing 2D arrays of input/output channels, the channel count is increased from N to $N^2$ for wavelength selective switches.

By way of example, and not of limitation, a switch configuration according to the present invention comprises a wavelength dispersive element, at least one focusing lens, and at least one mirror array. In one embodiment, a one-dimensional (1D) array of mirrors is configured such that each mirror has a dual scanning axis (i.e., each mirror can be scanned in X and Y directions). In another embodiment, two 1D arrays of single-axis mirrors are configured with orthogonal scanning directions. In both embodiments, the number of ports is increased from N to $N^2$. In the embodiment using an array of dual-axis mirrors, the switch is configured as a 2-$f$ system. In the embodiment using two arrays of single-axis mirrors, the switch is configured as a 4-$f$ imaging system.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention is embodied in the apparatus generally shown in FIG. 2 through FIG. 6. It will be appreciated that the apparatus may vary as to configuration and as to details of the parts, and that the method may vary as to the specific steps and sequence, without departing from the basic concepts as disclosed herein.

Figure 1:
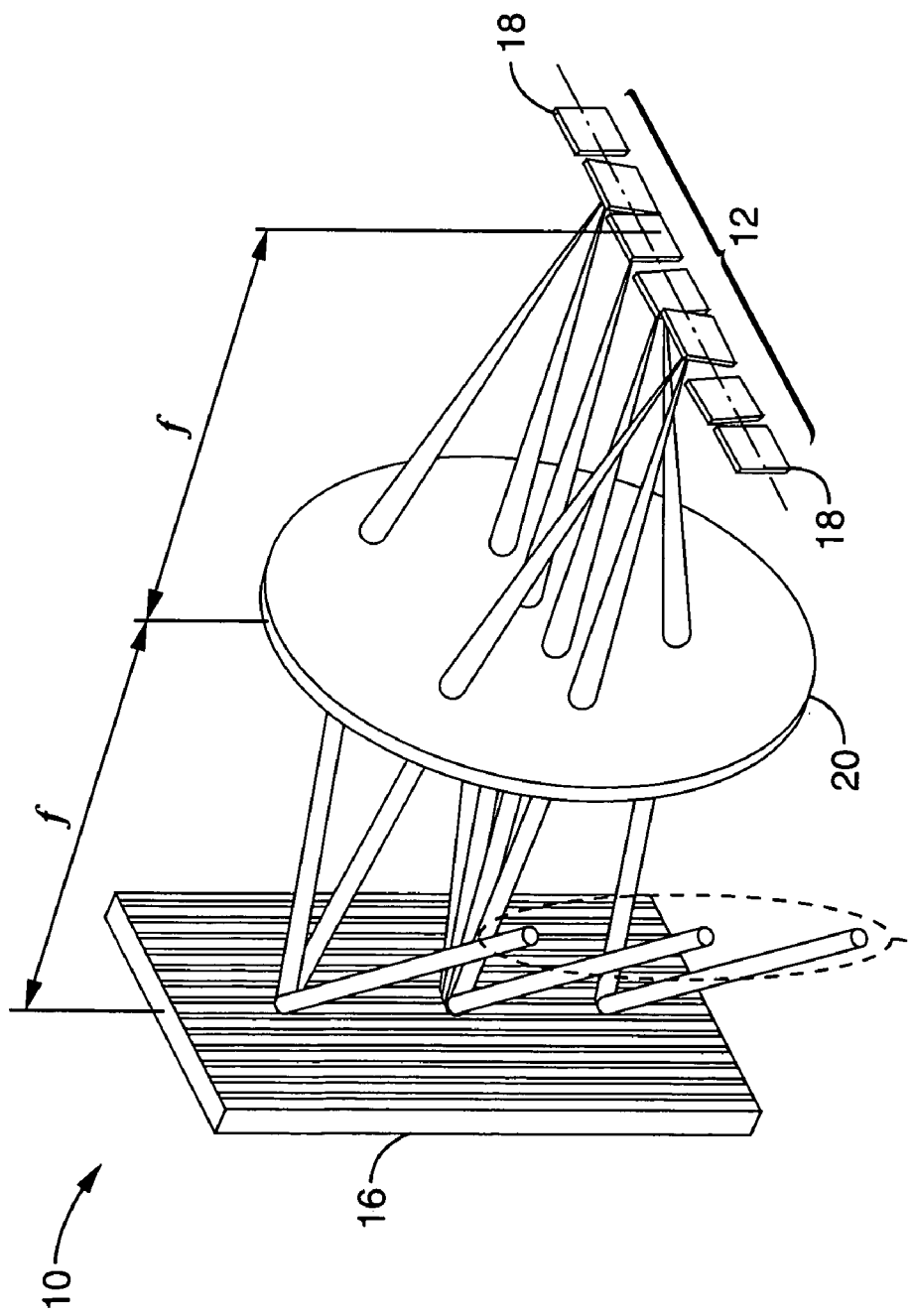
FIG. 1 is schematic perspective view of a 1D optical switch that employs a 1D array of one-axis scanning micromirrors configured to focus optical beams on a 1D array of output fibers according to conventional design.
Figure 2:
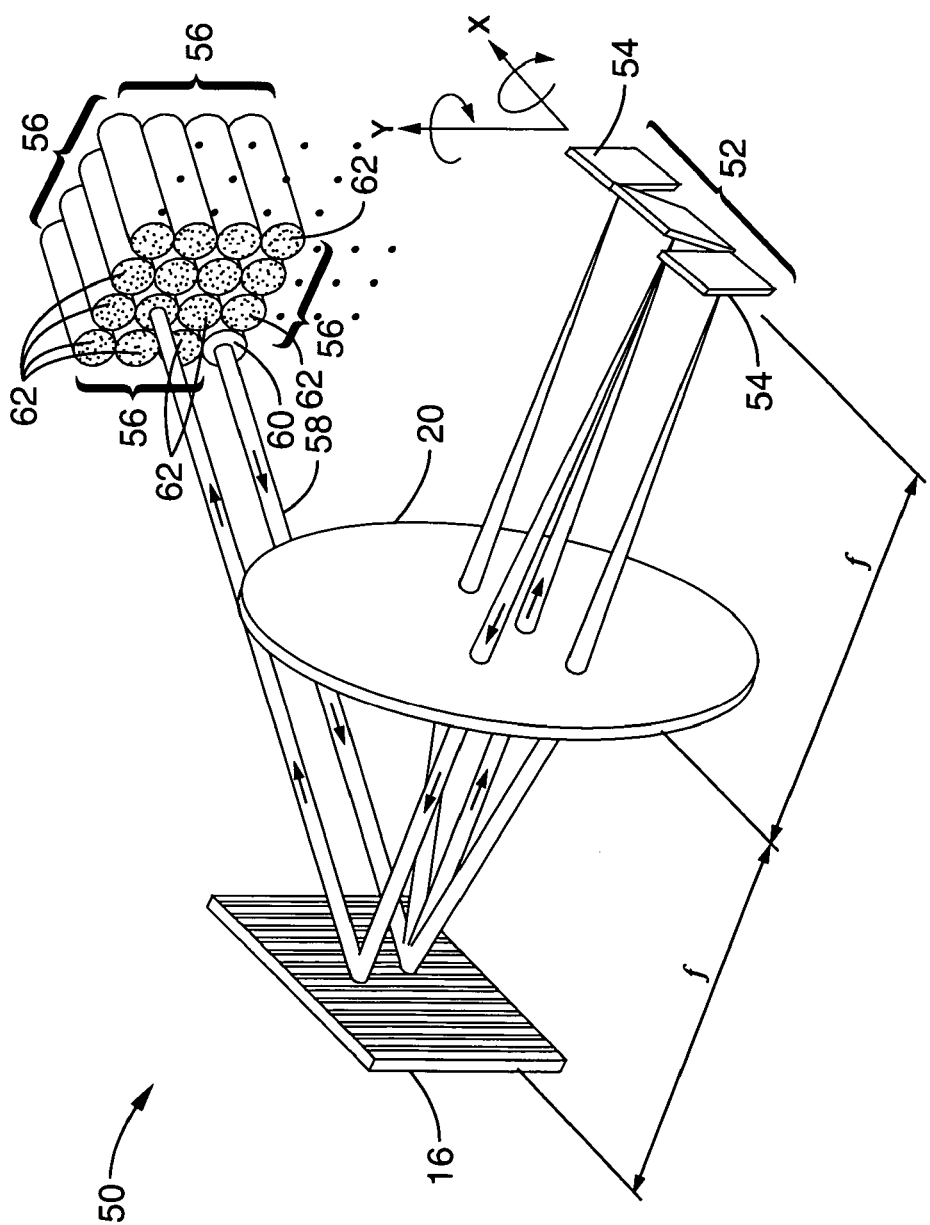
FIG. 2 is a schematic perspective view of an embodiment a 2D optical switch according to the present invention wherein the one-axis micromirrors in FIG. 1 have been replaced with dual-axis micromirrors and the 1D array of output fibers has been replaced with a 2D array of output fibers.

Referring first to FIG. 2, in one embodiment of the invention, a one-dimensional (1D) analog scanning micromirror array such as that shown in FIG. 1 is replaced with a two-dimensional (2D) scanning micromirror array. As can be seen, this embodiment of an optical switch 50 does not require a significant change in the arrangement of the optical components shown in FIG. 1. For example, in the embodiment shown in FIG. 2, mirror array 12 in FIG. 1 has been replaced with a mirror array 52 in which each mirror 54 has a dual scanning axis (i.e., each mirror can be scanned in the X and Y directions). In addition, the present invention employs a 2D output fiber array 56 instead of a 1D output fiber array that would be used with the configuration shown in FIG. 1. As can be seen, in the embodiment shown in FIG. 2, an optical beam 58 can be switched from the input fiber 60 to any of the output fibers 62 in the 2D output fiber array 56. Note that, for purposes of facilitating the discussion herein, input fiber 60 has been illustrated without shading while the remaining fibers are shaded to depict them as output fibers 62. It will be appreciated, however, that the fiber configuration can be rearranged such that the input fiber could be any one of the fibers in the array. In other words, the combination of input fiber 60 and output fibers 62 in array 56 form an overall input/output fiber array.

Those skilled in the art will appreciate that the wavelength dispersive element 16 can be a conventional type grating, such as a diffraction grating. In addition, imaging components such as lenses 20 used as means to focus the optical beams onto the mirrors can be microscopic or macroscopic optical elements, lenslets in combination with bulk lenses, and the like.

It will further be appreciated that the mirror arrays would preferably comprise Micro-Electro-Mechanical Systems (MEMS) micromirror arrays for both size and reliability considerations. However, control of dual-axis micromirrors is more complex than control of single-axis mirrors. Accordingly, in a second embodiment, instead of using an array of dual-axis mirrors, two 1D arrays of single-axis mirrors are configured with orthogonal scanning directions. As can be seen in the optical switch 100 shown in FIG. 3 through FIG. 5, the mirrors 102 in a first 1D array 104 rotate about a first axis and the mirrors 106 in a second 1D array 108 rotate about a second axis that is orthogonal to the first axis.

Figure 3:
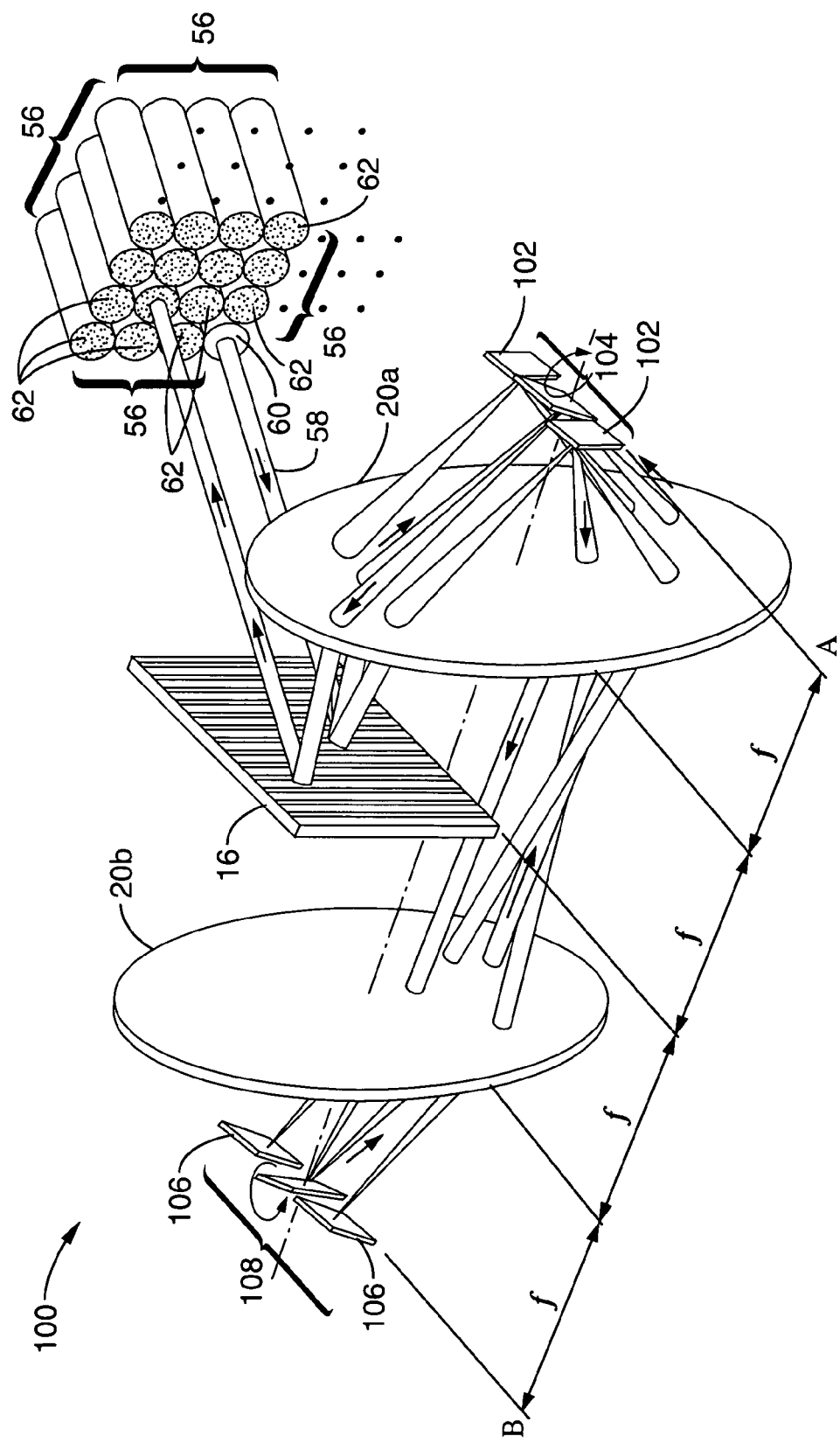
FIG. 3 is a schematic perspective view of a second embodiment of a 2D optical switch according to the present invention wherein the dual-axis micromirror array has been replaced with two 1D arrays of one-axis mirrors configured with orthogonal scanning directions.
Figure 4:
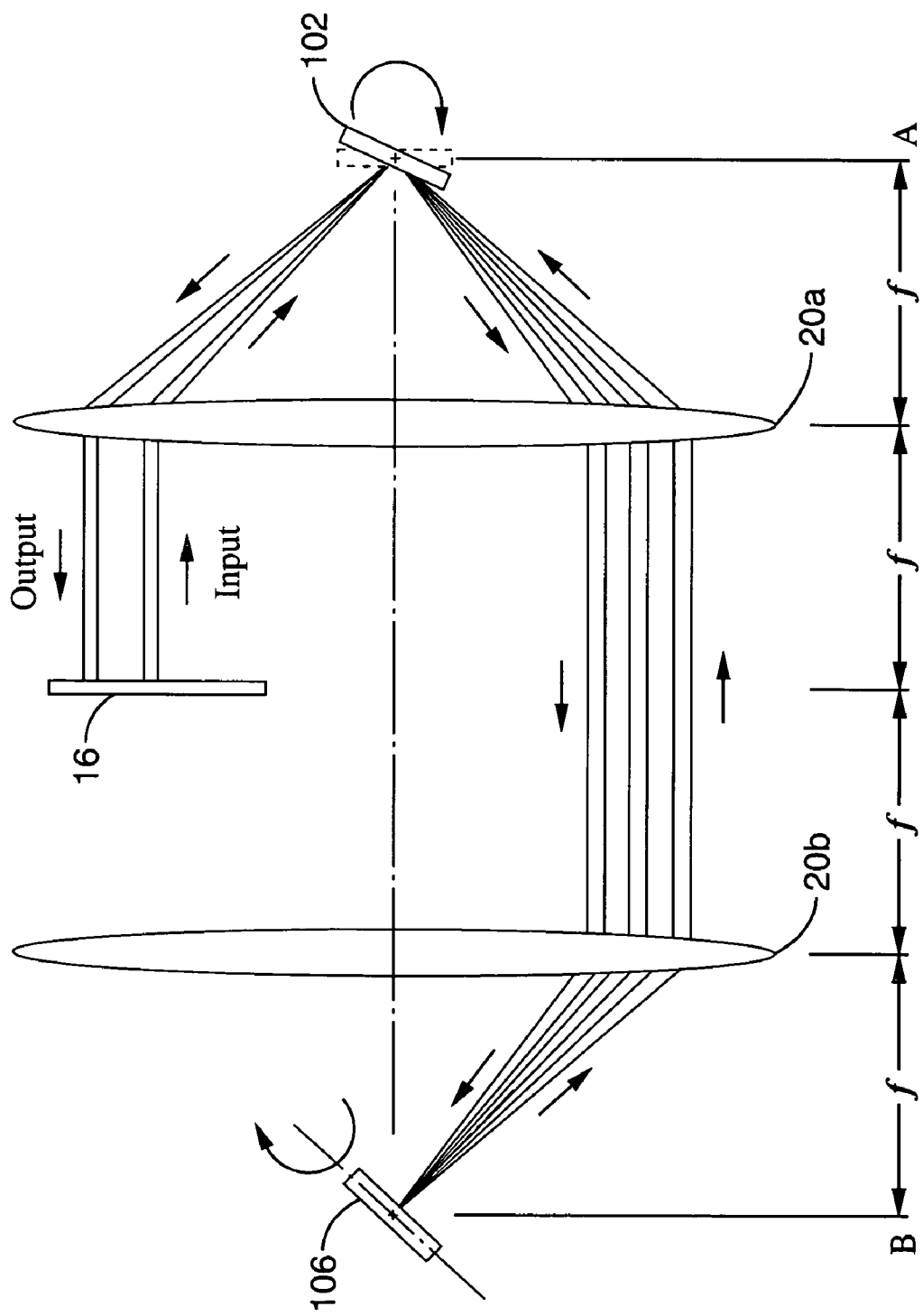
FIG. 4 is a schematic side view of the optical switch shown in FIG. 3.
Figure 5:
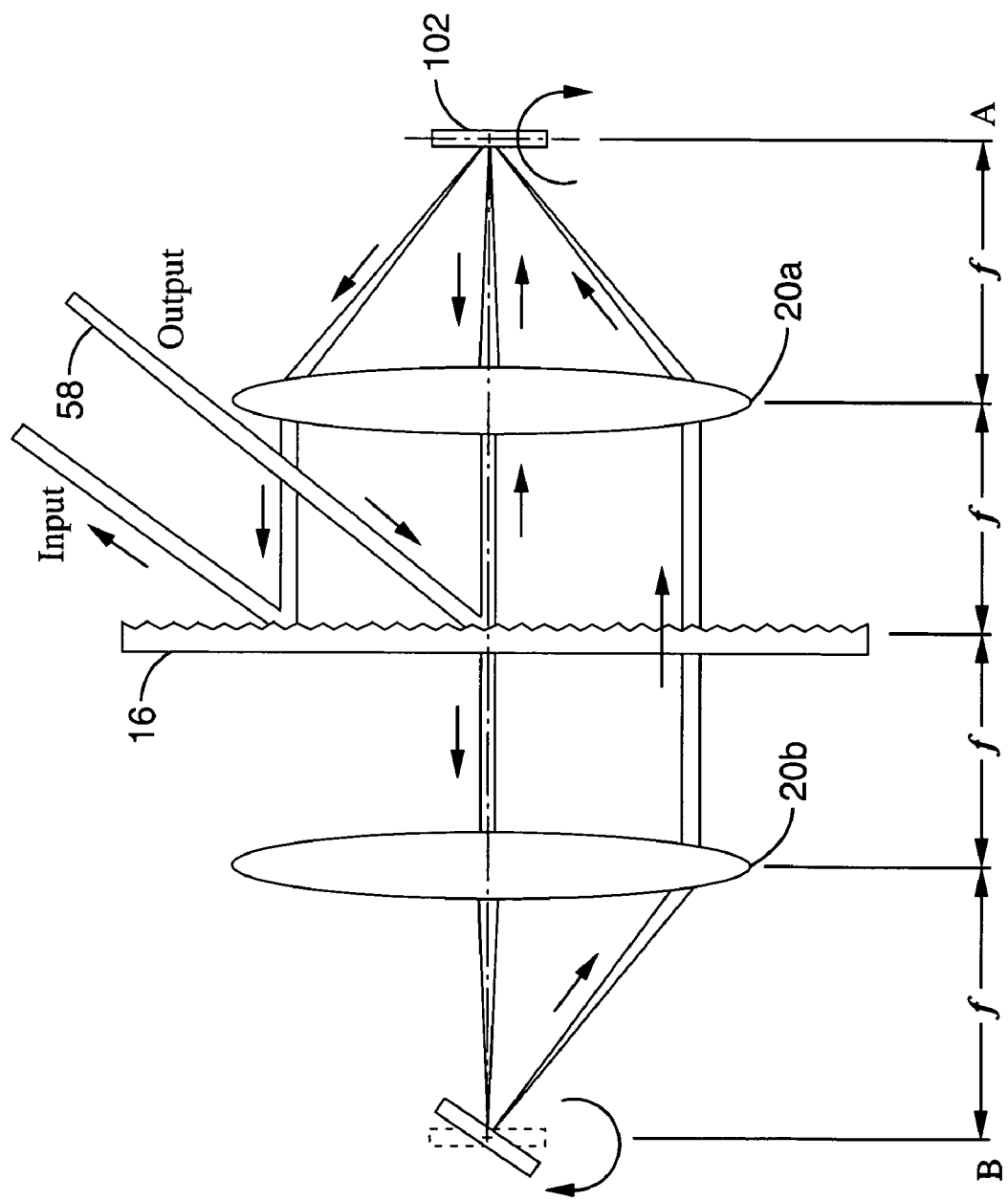
FIG. 5 is a schematic top plan view of the optical switch shown in FIG. 3.

In the optical switch 100 shown in FIG. 3 through FIG. 5, the two 1D arrays 102, 108 implement the 2D beam steering function. The two focusing lenses 20$a$, 20$b$ are arranged in a 4-$f$ confocal configuration to image the first micromirror array 104 in Plane A to the second micromirror array 108 in Plane B. The grating 16 is inserted between the lenses in the upper half of the system 100. It will be appreciated that, in this embodiment, the axial position of the grating is adjusted such that the projected light spot from the input port is located at the common focus of the two lenses. The 4-$f$ confocal configuration ensures that the optical beam focused on any mirror 102 in the first array 104 is always directed to the corresponding mirror 106 in the second array 108, and vice versa, irrespective of the tilting angle of the mirrors. Thus, each wavelength is steered by two micromirrors in orthogonal directions and directed towards the desired output fiber 62 in the 2D fiber array 56. Since a pair of micromirrors are used to steer the optical beam and the two mirrors scan in orthogonal directions, the optical beam can be guided into any arbitrary fiber in the 2D fiber array. Another benefit of this 4-$f$ configuration is that the optical beam passes through the first array twice. This doubles the deflection of the optical beam in the vertical direction. Therefore, more spatial channels can be supported.

It will be appreciated that the embodiments described above illustrate a 2D output fiber array 56. However, the optical switch can be implemented in either a 1×$N^2$ configuration where the 2D fiber array is the output array or in a $N^2$×1 configuration where the 2D fiber array is the input array. Therefore, it will also be appreciated that an optical switch according to the present invention comprises at least one input channel and at least one output channel, wherein either the input channel or the output channel comprises a 2D fiber array. It will further be appreciated that an optical beam can be switched from any input fiber to any output fiber.

EXAMPLE 1

A prototype system according to the embodiment shown in FIG. 3 through FIG. 5 was constructed using lenses with 15-cm focal lengths. A channel spacing of 75 GHz was attained with an 1100 grooves/mm grating. The number of wavelength channels was 15, which was limited only by the number of mirrors in the array that could be accommodated on our particular chip. The optical system supported a 3×3 fiber collimator array at the input plane, which was used as a 1×8 wavelength-selective switch with an input collimator located at the center of the array. Discrete collimators were used to simulate the 2D array. The focused beam waist on the micromirror was 30 μm. With a micromirror pitch of 160 μm, the acceptable beam waist can be as large 60 μm. Using this number, the input collimator size can be reduced by two times. Hence, the array size at the input plane can be increased to 5×5, which can be used for a 1×24 wavelength-selective switch. The fiber-to-fiber insertion loss of the system was measured to be 6 dB when the laser beam is coupled back to the input fiber collimator. The temporal response was measured when a square wave was applied to both arrays. The switching time was 150 μsec at the falling edge, and 700 μsec at the rising edge. The extinction ratio was 35 dB. When the laser beam was switched to a fiber channel right below the input collimator, the insertion loss was measured to be 8.6 dB. When switched to a diagonal channel at one of the corners, the insertion loss was measured to be 14 dB. The difference in insertion loss was attributed to the imperfect optical alignment. The spectral response at the input and the diagonal output fibers was measured. Ten of the fifteen wavelength channels were plotted. Switching at 1550 nm was clearly observed.

EXAMPLE 2

A prototype system according to the embodiment shown in FIG. 3 through FIG. 5 was constructed using 1×30 arrays of surface-micromachined analog micromirrors with orthogonal scanning directions. The system was configured with a 50 GHz channel spacing using an 1100 grooves/mm grating. The optical insertion loss was measured to be 12.5 dB, and the extinction ratio was measured to be 36 dB. The switching time was found to be less than 1 msec. Discrete commercial collimators with 2.5 mm beam waist were used due to their availability. If a 2D collimator array is used, a maximum of 4×10=40 spatial channels can be accommodated for the current optical design.

As discussed above, discrete collimators can be used in the embodiments of the invention heretofore described. The examples set forth above relied on the use of discrete collimators to simulate a 2D collimator array. However, the large housings of discrete collimators tend to reduce the practical port count, and the alignment of individual collimators is a cumbersome process. On the other hand, it will be appreciated that a monolithic 2D fiber collimator array can overcome the above disadvantages. Accordingly, referring to FIG. 6, a 1×N$^2$ WSS 200 with a monolithic 2D fiber collimator array 202 is illustrated. In this embodiment, each wavelength is steered by two micromirrors in orthogonal directions and directed toward the desired collimator in the 2D array 202. In addition, a telescope 204 having a pair of lenses 206, 208 is employed to expand the optical beams emerging from the 2D fiber collimator array.

EXAMPLE 3

Figure 6:
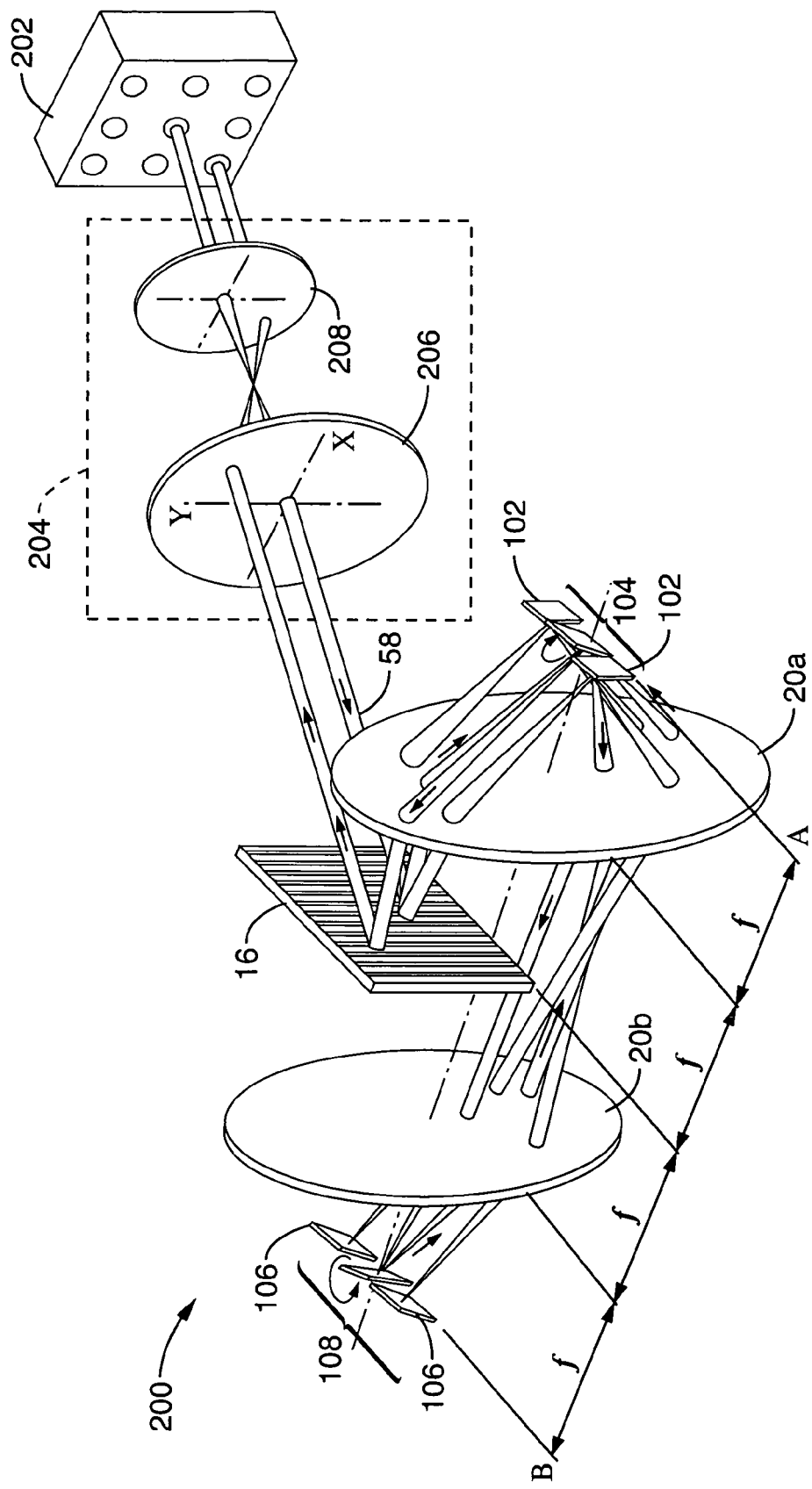
FIG. 6 is schematic perspective view of an alternative embodiment of the optical switch shown in FIG. 3 through FIG. 5 employing an embodiment of an integrated 2D fiber collimator array with a telescope beam expander according to the present invention.

A prototype system was constructed according to the embodiment shown in FIG. 6. A commercial 6×6 fiber collimator array was used in this system, and the pitch of the array was 1 mm with a beam radius of 125 μm. A 6× telescope was used to expand the optical beams before they are spatially dispersed by the grating. The beam expander reduces the optical spot size on the micromirror. A 600-grooves/mm grating and two lenses with 15-cm focal length were selected for this system. In addition, 10 of the 36 (6×6) spatial channels were covered by the effective lens area the system. Therefore, the system functioned as a 1×9 WSS but the port count can be increased by improving the fill factor of the 2D collimator array. The microlens diameter-to-pitch ratio of the collimator array was relatively low (50%). The fiber-to-fiber insertion loss was measured to be 14 dB when the optical beam was coupled back to the input port. When the optical beam was switched to another spatial channel, the insertion loss was measured to be 16.5 dB. The measured insertion loss was found to be higher than our previous results using discrete collimators for two reasons. First, the commercial collimator array was not optimized for the system and the beam spot size was larger than the mirror size, thus resulting in clipping loss. Second, the alignment tolerance is tighter since we cannot adjust angular misalignment of individual collimators. The temporal response was measured when the optical beam was switched from the input port to another output port. The switching time was less than 1 msec. The spectral response of 4 wavelength channels with 160-GHz (1.3 nm) channel spacing was measured (1548.7-nm, 1550-nm, 1551.3-nm, and 1552.6-nm). The 1550-nm channel was switched to the output port, while the other 3 channels were coupled back to the input port. Switching clearly occurred, and it was found that the extinction ratio can be improved by reducing the focused spot size on the device plane.

As can be seen, therefore, an advantage of the present invention over existing practices is that use of a 2D fiber array increases the number of fiber ports from N to N$^2$, where N is the number of input/output ports for a 1D fiber array configuration. Accordingly, the invention facilitates the implementation of multi-port optical add-drop multiplexers with >10 output ports which are desired for dense wavelength division multiplexed (DWDM) networks. By optimizing the mirror and collimator sizes, the port count of the system can be expanded considerably.

Furthermore, it will be appreciated that the invention can achieve these advantages using conventional lenses, gratings, and the like. Additionally, various micromirror and actuator designs can be used for the micromirrors, including, but not limited to, those described in U.S. Pat. No. 6,097,859, incorporated herein by reference, those described in Hah, S. Huang, H. Nguyen, H. Chang, H. Toshiyoshi, and M. C. Wu, "A low voltage, large scan angle MEMS micromirror array with hidden vertical comb-drive actuators for WDM routers," 2002 Optical Fiber Communication (OFC) Conference, Anaheim, Calif., Mar. 17-24, 2002, incorporated herein by reference, and those described in D. Hah, S. Huang, H. Nguyen, H. Chang, J. C. Tsai, and M. C. Wu, "Low voltage MEMS analog micromirror arrays with hidden vertical comb-drive actuators," Solid-State Sensor, Actuator, and Microsystems Workshop, June 2002, p. 11-14, incorporated herein by reference.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of optically switching multiple wavelengths to and from a two-dimensional array of optical ports, comprising:
    controlling the single-axis angular position of rotating micromirror elements within a first and second micromirror array;
    receiving an optical beam containing multiple wavelengths from a two-dimensional array of optical ports;
    dispersing wavelength components of said optical beam which reflect from a wavelength dispersive element;
    reflecting said wavelength components from micromirror elements of the first micromirror array in a first plane toward the second micromirror array in a second plane;
    reflecting said wavelength components from micromirror elements in said second micromirror array in the second plane toward said first micromirror array;
    reflecting said wavelength components from micromirror elements in said first micromirror array toward said wavelength dispersive element; and
    directing an optical beam containing said wavelength components from said wavelength dispersive element to said two-dimensional array of optical ports.

2. A method as recited in claim 1, wherein said wavelength dispersive element comprises a diffraction grating.

3. A method as recited in claim 1, wherein said diffraction grating is disposed proximal the path between said first and second micromirror arrays.

4. A method as recited in claim 1, wherein micromirrors within said micromirror array comprises micro-electro-mechanical systems (MEMS) micromirrors.

5. A method as recited in claim 1, further comprising at least one imaging component configured for positioning said optical beam onto said first array, said second array, or a combination of said first and second array of actuated mirrors.

6. A method as recited in claim 5, wherein said imaging component comprises at least one lens.

7. A method as recited in claim 1, wherein said first plane and said second plane are configured in a 4-$f$ confocal arrangement.

8. A method as recited in claim 1, wherein said diffraction grating lies equal distance between said first micromirror array and said second micromirror array.

9. A method as recited in claim 8:
    wherein at least one imaging component comprises at least one lens; and
    wherein said at least one lens is disposed between said diffraction grating and said first micromirror array and said second micromirror array.

10. A method as recited in claim 1, wherein micromirrors in said second micromirror array are configured for rotating in a single axis which is orthogonal to the axis of rotation for said first micromirror array.

11. A method of optically switching multiple wavelengths to and from a two-dimensional array of optical ports, comprising:
    controlling the single-axis angular position of rotating micromirror elements within a first and second micromirror array;
    receiving an optical beam containing multiple wavelengths from a two-dimensional array of optical ports;
    dispersing wavelength components of said optical beam which reflect from a wavelength dispersive element;
    focusing said wavelength components received from said wavelength dispersive element through a first imaging component to a first plane;
    rotating micromirror elements within a first micromirror array located on said first plane, each micromirror in said first micromirror array configured for rotation about a single axis;
    reflecting said wavelength components from said micromirror elements to said first imaging component assembly;
    directing said wavelength components from said first imaging component assembly to a second imaging component;
    focusing said wavelength components through said second imaging component to a second plane;
    rotating micromirror elements within a second micromirror array located on said second plane, each micromirror in said second micromirror array configured for rotation about a single axis in response to said micromirror deflection signal;
    reflecting said wavelength components from said micromirror elements to said second imaging component;
    directing said wavelength components through said second imaging component to said first imaging component;
    focusing said wavelength components through said first imaging component to said first micromirror array in said first plane;
    reflecting said wavelength components from said first micromirror array back to said first imaging component;
    directing said wavelength components through said first imaging component to said wavelength dispersive element; and
    directing an optical beam containing said wavelength components from said wavelength dispersive element to said two-dimensional array of optical ports.

12. A method as recited in claim 11, wherein said wavelength dispersive element comprises a diffraction grating.

13. A method as recited in claim 11, wherein said first and/or second imaging components comprise at least one lens.

14. A method as recited in claim 11, wherein the single axis rotation of micromirrors in said second micromirror array is orthogonal to the rotation of micromirrors in said first micromirror array.

15. A method as recited in claim 11, wherein said first plane and said second plane are positioned in a 4-$f$ confocal arrangement.

16. A method as recited in claim 11, wherein said wavelength dispersive element lies equal distance between said first micromirror array and said second micromirror array.

17. A wavelength selective optical switch, comprising:
a two-dimensional array of optical ports configured for communicating optical beams containing multiple wavelength components, and having a plurality of ports including a first and second port;
a wavelength dispersive element configured for separating at least one wavelength component in said optical beams from at least one other wavelength component in said optical beams;
a first array of single-axis actuated mirrors; and
a second array of single-axis actuated mirrors;
wherein said first array receives dispersed optical beams from said wavelength dispersive element and directs them onto said second array, and receives dispersed optical beams from said second array back onto said wavelength dispersive element;
wherein said first and second arrays of actuated mirrors are configured for switching the wavelength components of said optical beam from said first port to a second port within said two-dimensional array of optical ports.

18. A wavelength selective optical switch as recited in claim 17, wherein said second array of mirrors is configured with a scanning direction that is orthogonal to said first array of mirrors.

19. A wavelength selective optical switch as recited in claim 17, wherein said first and second array of mirrors are configured in a 4-$f$ confocal arrangement centered on said wavelength dispersive element.

20. A wavelength selective optical switch as recited in claim 17, further comprising at least one imaging component configured for positioning said optical beam onto said first array, or said second array, or a combination of said first and second arrays of actuated mirrors.

21. A wavelength selective optical switch as recited in claim 17, further comprising means for collimating optical beams in said optical switch.

22. A wavelength selective optical switch as recited in claim 21, wherein said means for collimating optical beams in said optical switch comprises a monolithic two-dimensional collimator array.

23. A wavelength selective optical switch as recited in claim 17, wherein said wavelength selective optical switch is incorporated within an N×N fully non-blocking wavelength-selective optical crossconnect.

24. A wavelength selective optical switch as recited in claim 17, wherein said wavelength selective optical switch is incorporated within an optical network.

25. A wavelength selective optical switch, comprising:
a two-dimensional array of optical ports configured for communicating optical beams containing multiple wavelength components, and having a plurality of ports including a first and second port;
a wavelength dispersive element configured for separating at least one wavelength component in said optical beams from at least one other wavelength component in said optical beams;
a first array of single-axis actuated mirrors;
a second array of single-axis actuated mirrors; and
said first and second arrays of mirrors are configured in a 4-$f$ confocal arrangement centered on said wavelength dispersive element;
wherein said first and second arrays of actuated mirrors are configured for switching the wavelength components of said optical beam from said first port to a second port within said two-dimensional array of optical ports.

* * * * *